US012656575B2

(12) United States Patent
Sun et al.

(10) Patent No.: US 12,656,575 B2
(45) Date of Patent: Jun. 16, 2026

(54) OPTICAL SYSTEM AND HEAD MOUNTED DISPLAY

(71) Applicant: GOERTEK OPTICAL TECHNOLOGY CO., LTD, Shandong (CN)

(72) Inventors: Qi Sun, Shandong (CN); Bogang Zhao, Shandong (CN)

(73) Assignee: GOERTEK OPTICAL TECHNOLOGY CO., LTD, Shandong (CN)

( * ) Notice: Subject to any disclaimer, the term of this patent is extended or adjusted under 35 U.S.C. 154(b) by 492 days.

(21) Appl. No.: 18/246,985

(22) PCT Filed: Dec. 14, 2021

(86) PCT No.: PCT/CN2021/137745
§ 371 (c)(1),
(2) Date: Mar. 28, 2023

(87) PCT Pub. No.: WO2023/097763
PCT Pub. Date: Jun. 8, 2023

(65) Prior Publication Data
US 2024/0361572 A1     Oct. 31, 2024

(30) Foreign Application Priority Data

Nov. 30, 2021     (CN) ......................... 202111446784.7

(51) Int. Cl.
*G02B 9/12*          (2006.01)
*G02B 3/08*          (2006.01)
(Continued)

(52) U.S. Cl.
CPC ................. *G02B 9/12* (2013.01); *G02B 3/08* (2013.01); *G02B 13/0015* (2013.01);
(Continued)

(58) Field of Classification Search
CPC .......... G02B 9/10; G02B 9/12; G02B 13/003; G02B 13/0035; G02B 27/012
See application file for complete search history.

(56) References Cited

U.S. PATENT DOCUMENTS

| | | | |
|---|---|---|---|
| 10,429,613 B2 | 10/2019 | Bone et al. | |
| 2007/0091473 A1 | 4/2007 | Shimizu | |

(Continued)

FOREIGN PATENT DOCUMENTS

| | | |
|---|---|---|
| CN | 102902058 A | 1/2013 |
| CN | 105137567 A | 12/2015 |

(Continued)

OTHER PUBLICATIONS

Machine translation of CN 213934401 U retrieved electronically from PE2E Search Jul. 5, 2025 (Year: 2025).*

(Continued)

*Primary Examiner* — Cara E Rakowski
(74) *Attorney, Agent, or Firm* — Ingrassia Fisher & Lorenz, LLP

(57)          ABSTRACT

An optical system and a head mounted display are disclosed. The optical system comprises: a third lens, a second lens and a first lens arranged successively along a propagation direction of incident light. The effective focal length f1 of the first lens and the effective focal length f2 of the second lens are both greater than the effective focal length f of the optical system. The present disclosure provides a solution of a direct transmission optical structure, with short-focus, high light efficiency and high-resolution which has a good imaging quality.

12 Claims, 4 Drawing Sheets

(51) Int. Cl.

| | | |
|---|---|---|
| *G02B 9/10* | (2006.01) | |
| *G02B 13/00* | (2006.01) | |
| *G02B 27/01* | (2006.01) | |
| *G06F 1/16* | (2006.01) | |

(52) U.S. Cl.

CPC ......... *G02B 27/0101* (2013.01); *G06F 1/163* (2013.01); *G02B 9/10* (2013.01); *G02B 13/003* (2013.01)

(56) References Cited

U.S. PATENT DOCUMENTS

| | | | | |
|---|---|---|---|---|
| 2013/0003184 A1* | 1/2013 | Duparre | ............... | G02B 13/005 |
| | | | | 359/784 |
| 2016/0070103 A1 | 3/2016 | Yoon | | |
| 2017/0248769 A1 | 8/2017 | Stamenov | | |
| 2020/0057296 A1 | 2/2020 | Uhlendorf et al. | | |
| 2021/0302627 A1* | 9/2021 | Suzuki | ................. | G02B 25/001 |

FOREIGN PATENT DOCUMENTS

| | | | | |
|---|---|---|---|---|
| CN | 106338820 | A | | 1/2017 |
| CN | 106405817 | A | | 2/2017 |
| CN | 107861253 | A | | 3/2018 |
| CN | 208506366 | U | | 2/2019 |
| CN | 111868603 | A | | 10/2020 |
| CN | 112630973 | A | | 4/2021 |
| CN | 112630974 | A | | 4/2021 |
| CN | 112684529 | A | | 4/2021 |
| CN | 213934401 | U | * | 8/2021 |
| CN | 213934403 | U | | 8/2021 |
| JP | 2017211475 | A | | 11/2017 |
| JP | 2020020935 | A | | 2/2020 |

OTHER PUBLICATIONS

Machine translation of CN 112630973 A retrieved electronically from Espacenet Jul. 3, 2025 (Year: 2025).*
Machine translation of CN106405817 A retrieved electronically from Espacenet Jul. 3, 2025 (Year: 2025).*

* cited by examiner

OPTICAL SYSTEM AND HEAD MOUNTED DISPLAY

CROSS-REFERENCE TO RELATED APPLICATIONS

This Application is a U.S. National-Stage entry under 35 U.S.C. § 371 based on International Application No. PCT/CN2021/137745, filed Dec. 14, 2021 which was published under PCT Article 21 (2) and which claims priority to Chinese Application No. 202111446784.7, filed Nov. 30, 2021, which are all hereby incorporated herein in their entirety by reference.

TECHNICAL FIELD

This application pertains to the technical field of optical imaging, more specifically, to an optical system and a head mounted display.

BACKGROUND

In recent years, augmented reality (AR) technology and virtual reality (VR) technology have been applied in intelligent wearable devices and developed rapidly. The core component of both the augmented reality technology and the virtual reality technology is the display optical system. The display effect of the display optical system will directly determine the quality of intelligent wearable devices.

In the prior art, take VR devices as an example, most conventional VR devices use a display optical system obtained by combining a one-piece lens with a display screen. However, due to the optical path imaging requirements, the lens will be far away from the display screen, which leads to the large size of the VR device and is not conducive to the miniaturization of the product, and may lead to poor use experience when the user wears the VR device. In addition, there are also conventional VR devices adapting a solution of folded optical path. Although this solution can realize the miniaturization and lightweight of VR devices, it has the problems of high production cost, low light efficiency (<25%) and ghosting. In addition, other objects, desirable features and characteristics will become apparent from the subsequent summary and detailed description, and the appended claims, taken in conjunction with the accompanying drawings and this background.

SUMMARY

The object of the present disclosure is to provide a new technical solution of an optical system and a head mounted display.

According to an aspect of the present disclosure, an optical system is provided. The optical system comprises:
 a third lens, a second lens and a first lens arranged successively along a propagation direction of incident light;
 wherein an effective focal length f1 of the first lens and an effective focal length f2 of the second lens are both greater than an effective focal length f of the optical system.

Optionally, the first lens and the second lens both have positive focal powers, and the third lens has a negative focal power.

Optionally, the first lens and the second lens are glued together.

Optionally, the two glued surfaces of the first lens and the second lens are both Fresnel surfaces.

Optionally, a sum of the effective focal length f1 of the first lens and the effective focal length f2 of the second lens is greater than an absolute value of the effective focal length f3 of the third lens.

Optionally, the effective focal length f1 of the first lens is set to 20 mm≤f1≤40 mm;
 the effective focal length f2 of the second lens (2) is set to 20 mm≤f2≤40 mm; and
 the effective focal length f3 of the third lens (3) is set to −100 mm≤f3≤−50 mm.

Optionally, the effective focal length f of the optical system satisfies 15 mm≤f≤25 mm.

Optionally, an spacing T1 is provided between the first lens 1 and the second lens 2, and the spacing T1 is set to 0.1 mm≤T1≤0.5 mm;
 a spacing Y is provided between the second lens and the third lens, and the spacing Y is set to 2 mm≤Y≤4.5 mm; and
 the first lens, the second lens and the third lens are located on a same optical axis.

Optionally, the first lens and the second lens are made of a same material, and are made of a COP material; and
 the third lens is made of an OKP material or an EP material.

According to another aspect of the present disclosure, a head mounted display is provided. The head mounted display comprises an optical system as described above.

The beneficial effects of the present disclosure are as follows.

In the solution according to the embodiment of the present disclosure, multiple lenses are used. By reasonably setting the effective focal lengths of the lenses, it is conducive to meet the optical requirements of short-focus, high light efficiency and high resolution of the entire optical path structure, thereby facilitates improving the imaging quality. The embodiments of the present disclosure propose a solution of direct transmission optical path structure having short-focus, high-resolution, and the optical system obtained can be applied in, for example, head mounted displays (such as VR devices).

By the following detailed description of the exemplary embodiments of the present disclosure with reference to the accompanying drawings, other features and advantages of the present disclosure will become clear.

BRIEF DESCRIPTION OF DRAWINGS

The present invention will hereinafter be described in conjunction with the following drawing figures, wherein like numerals denote like elements, and.

US 12,656,575 B2

3

Figure 8:
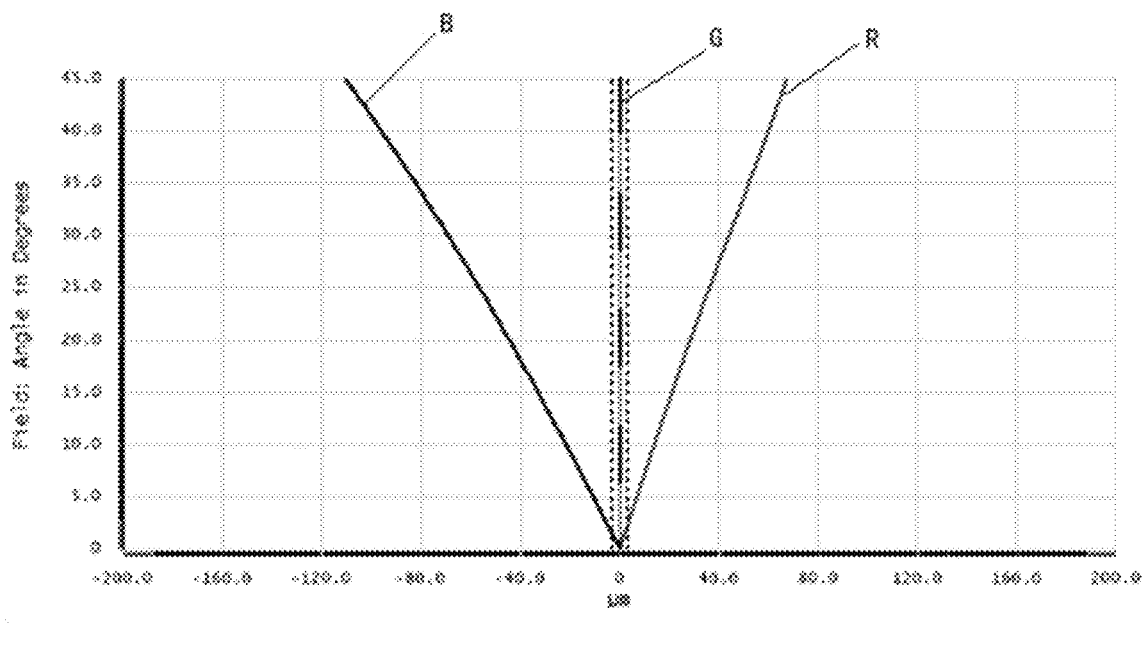

FIG. 8 is a dispersion diagram of an optical system according to the first embodiment of the present disclosure.

In the drawings: 1. first lens; 2. second lens; 3. third lens; 4. display screen; 5. human eye; 11. first surface; 12. second surface; 21. third surface; 22. fourth surface; 31. fifth surface; 32. sixth surface.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail, but in appropriate cases, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

The optical systems and the head mounted displays according to embodiments of the present disclosure will be described in detail below with reference to FIGS. 1 to 8.

According to an aspect of the present disclosure, an optical system is provided.

The optical system is a direct transmission optical system having short-focus and high-resolution, which is suitable for application in electronic devices, for example, head mounted displays (HMD) such as VR devices (such as VR glasses or VR helmets). It has a good application prospect.

Figure 1:
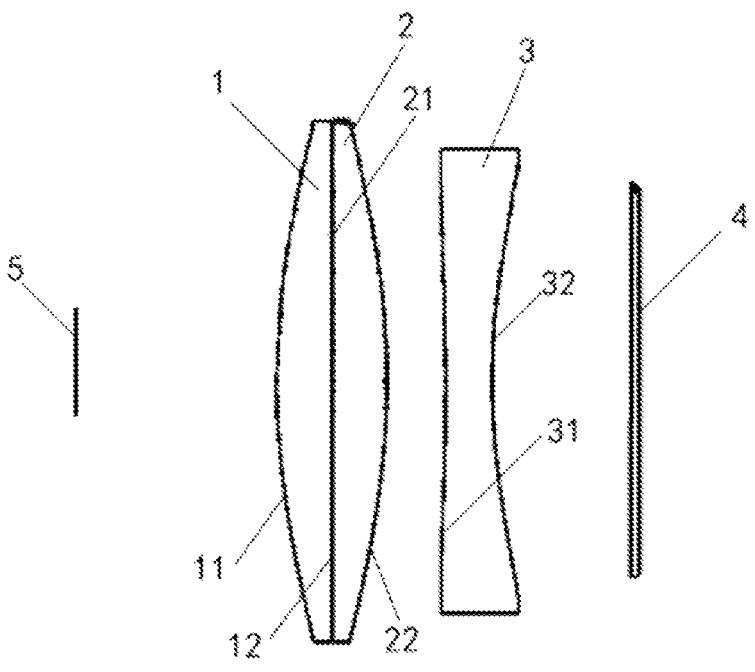
FIG. 1 is a schematic diagram of the structure of an optical system according to an embodiment of the present disclosure.
Figure 2:
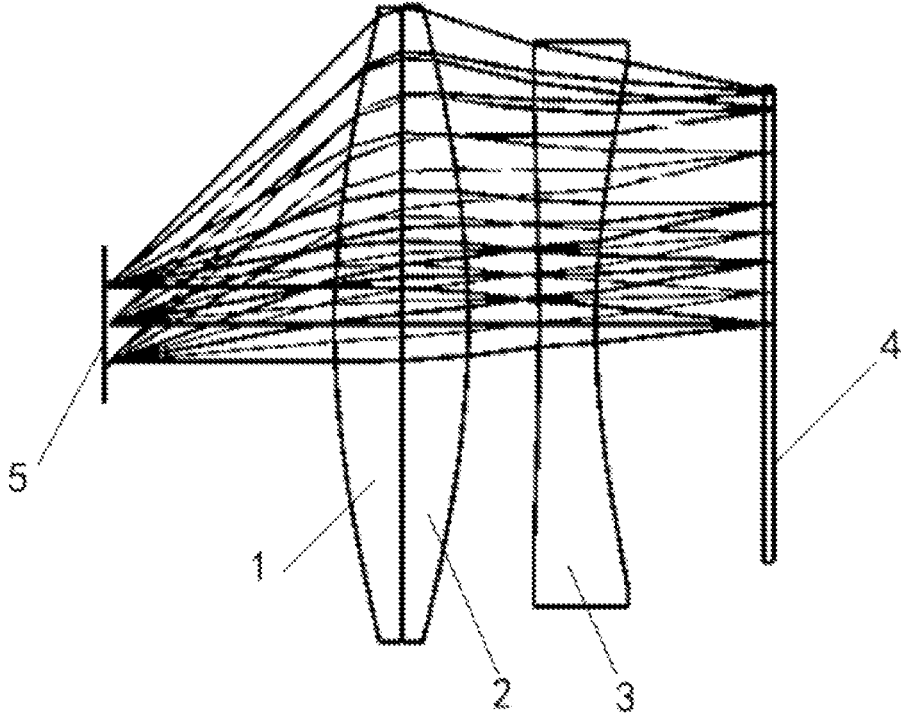
FIG. 2 is a schematic diagram of the imaging principle of an optical system according to an embodiment of the present disclosure.

The optical system according to an embodiment of the present disclosure, as shown in FIGS. 1 and 2, comprises a third lens 3, a second lens 2 and a first lens 1 arranged successively along the propagation direction of the incident light. An effective focal length f1 of the first lens 1 and an effective focal length f2 of the second lens 2 are both greater than an effective focal length f of the optical system.

The optical system according to the embodiment of the present disclosure is designed as a direct transmission optical path structure. The design of optical path structure is relatively simple so that the whole optical system is easy to make.

It should be noted that the optical system may also comprise a display screen 4.

In the optical path structure, the display screen 4 can be used to emit light, i.e., the incident light as stated above.

That is to say, in the optical system according to the embodiment of the present disclosure, a lens combination is designed, which comprises, for example, three lenses, as shown in FIGS. 1 and 2. The lenses are arranged at a light exit side of the display screen 4 (specifically, in the propagation direction of the incident light emitted from the display screen 4), and can be used to project the incident light into the human eye 5 for imaging.

As shown in FIG. 1 and FIG. 2, in the solution according to an embodiment of the present disclosure, multiple lenses (such as three lenses) are used, and by reasonably setting the effective focal lengths of the lenses, it is conducive to meet the optical requirements of short-focus, high light efficiency and high resolution of the entire optical path structure, thereby facilitates improving the imaging quality.

The embodiment of the present disclosure proposes a solution of direct transmission optical path structure having short-focus and high-resolution, and the optical system obtained can be applied in, for example, head mounted displays (such as VR devices), and facilitates the miniaturization and lightweight of head mounted displays.

In sum, the solution according to the embodiment of the present disclosure overcomes the problems caused by the conventional combination solution of one-piece lens plus display screen, i.e., the lens is far away from the display screen, which leads to the larger size of the VR device and is not conducive to the miniaturization of the product; moreover, the light efficiency is low. At the same time, it can also overcome the defects caused by using a folded optical path, and has relatively low processing difficulty and production cost; the direct transmission optical structure is also simpler than the folded optical path.

For example, as shown in FIGS. 1 and 2, the optical system is provided with a display screen 4. The display screen 4 is, for example, a 1.4 inch display which realizes a 100 degree field of view. On this basis, the conventional one-piece lens (1P) structure or two-piece lens (2P) structure is not enough to distinguish this type of display screen. The reason is as follows.

The one-piece lens (1P) structure only has two surfaces for optimization of surface freedom, its convergence ability is limited, and the aberration or chromatic aberration cannot be corrected. The pixel size (i.e., spot size) that can be distinguished in the full field of view is about 80 μm to 100 μm. More importantly, it cannot realize short-focus.

The two-piece lens (2P) structure increases the surface freedom of lens surface for optimization and can realize short-focus, but it still has the limitation of resolution. Its pixel size (i.e., imaging spot size) that can be distinguished in the full field of view is about 60 μm to 80 μm.

The combined structure of optical lenses adopted in the embodiment of the present disclosure can further improve the resolution, and can correct the chromatic aberration to a certain extent. What is formed is a direct transmission short-focus optical path structure.

In some examples of the present disclosure, the first lens 1 and the second lens 2 both have positive focal powers, and the third lens 3 has a negative focal power.

It can be understood that in the optical system according to the embodiment of the present disclosure, the first lens 1 and the second lens 2 are both designed as positive lenses, and the third lens 3 is designed as a negative lens. Two positive lenses can provide a large positive power, while the negative lens can be used to eliminate chromatic aberration.

In some examples of the present disclosure, the first lens 1 and the second lens 2 are glued together.

Namely, in the embodiment of the present disclosure, the two positive lenses are designed to be glued together, while the negative lens is designed to be separated from the two glued positive lenses.

As shown in FIGS. 1 and 2, it can be understood that in the optical path structure, the first lens 1 and the second lens 2 that are on the side far from the display screen 4 are glued together, which facilitates reducing stray light; the third lens 3 that is on the side close to the display screen 4 is arranged independently, so that it is separated from the two glued lenses, which facilitates improving the imaging quality.

In addition, the design of making the first lens 1 and the second lens 2 glued together can reduce the difficulty of assembly of structural components and the risk of generating impurities between lenses during the assembly, and thus improve the yield.

In some examples of the present disclosure, as shown in FIGS. 1 and 2, the two glued surfaces of the first lens 1 and the second lens 2 are both Fresnel surfaces.

In other words, in the optical system, two Fresnel surfaces are arranged adjacent to each other, and these two Fresnel surfaces are glued together. This design can realize the low dispersion and short-focus of the optical path structure, and can also reduce stray light, which makes the optical system obtained have high light efficiency and be able to realize high-resolution imaging.

In some examples of the present disclosure, as shown in FIG. 1, the first lens 1 comprises a first surface 11 and a second surface 12, and the second lens 2 comprises a third surface 21 and a fourth surface 22. In the entire optical system, the second surface 12 and the third surface 21 are arranged adjacent to each other and both are set as Fresnel surfaces, and the first surface 11 and the fourth surface 22 are aspherical surfaces (further, both surfaces are convex surfaces).

The first surface 11 of the first lens 1 directly faces the human eye 5 and is located externally. The second surface 12 of the first lens 1 and the third surface 21 of the second lens 2 are arranged adjacent to each other. In the present disclosure, the first surface 11 of the first lens 1 is set as an aspherical surface (such as a convex surface), and the second surface 12 of the first lens 1 is set as a Fresnel surface. In this way, the first lens 1 (a positive lens) has a combined surface shape of two surface shapes: aspherical surface+Fresnel surface.

Optionally, in the embodiment of the present disclosure, it is designed that the first surface 11 and the second surface 12 of the first lens 1 are respectively plated with an anti-reflection (AR) film.

After the two surfaces of the first lens 1 are respectively plated with an anti-reflection film, the reflected light can be reduced by the anti-reflection films, thereby increasing the transmissivity of light on the two surfaces of the first lens 1.

Optionally, the first surface 11 of the first lens 1 may be plated with a hardened film in addition to the anti-reflection film.

The reason is that the first surface 11 of the first lens 1 faces outward and needs to avoid scratches, collisions and other damages. The service life of the first lens 1 can be improved by plating the hardened film. The hardness, strength, etc. of the first surface 11 can be improved by plating the hardened film on the first surface 11 (i.e., hardening the first surface 11). This is beneficial to improve the service life of the entire optical system.

Of course, in the embodiments of the present disclosure, it is not limited to the first surface 11 of the first lens 1 that is plated with a hardened film, the second surface 12 of the first lens 1 may also be plated with a hardened film. Those skilled in the art can flexibly adjust according to specific needs, and the present disclosure has no particular limitation herein.

In addition, in the embodiment of the present disclosure, the first lens 1 may further have the following parameters.

For example, the absolute value of the radius R1 of the first surface 11 of the first lens 1 satisfies 35 mm≤R1≤65 mm; the absolute value of the radius R2 of the second surface 12 of the first lens 1 satisfies 20 mm≤R2≤40 mm; the absolute value of the conic constant K1 of the first surface 11 and the second surface 12 of the first lens 1 satisfies K1≤20.

The surface shape of the first surface 11 is different from that of the second surface 12.

Specifically, the first surface 11 facing outward is designed as an aspherical surface (such as a convex surface), while the second surface 12 is designed as a Fresnel surface. When the first lens 1 formed by combining the Fresnel surface and the aspherical surface is used in the optical path structure, it facilitates realizing short-focus and high resolution.

In the embodiment of the present disclosure, after optimizing the surface shape of the first lens 1, if the processing difficulty and cost are considered, more preferably, the conic constant (i.e., K1) of the first lens 1 is, for example, within [−10, 10], and the radius R of the Fresnel surface of the first lens 1 is greater than 23 mm.

In some examples of the present disclosure, the second lens 2 and the first lens 1 may have the same combination form of surface shapes. As shown in FIGS. 1 and 2, the second lens 2 comprises a third surface 21 and a fourth surface 22, the third surface 21 is a Fresnel surface, and the fourth surface 22 is set as an aspherical surface (such as a convex surface).

Optionally, the third surface 21 and the fourth surface 22 are also plated with an anti-reflection film.

The reflection light is reduced by the anti-reflection films, thereby increasing the transmissivity of light on the two surfaces of the second lens 2.

In addition, in the embodiment of the present disclosure, the second lens 2 may further have the following parameters.

In some examples of the present disclosure, the absolute value of the radius R3 of the third surface 21 of the second lens 2 satisfies 20 mm≤R3≤40 mm; the absolute value of the radius R4 of the fourth surface 22 of the second lens 2 satisfies 35 mm≤R4≤80 mm; the absolute value of the conic constant K2 of the third surface 21 and the fourth surface 22 of the second lens 2 satisfies K2≤20.

In the embodiment of the present disclosure, after optimizing the surface shape of the second lens 2, if the processing difficulty and cost are considered, more preferably, the conic constant (i.e., K2) of the second lens 2 is, for example, within [−10, 10], and the radius R of the Fresnel surface of the second lens 2 is greater than 23 mm. This is substantially the same as the first lens 1.

It should be noted that the first lens 1 and the second lens 2 both have Fresnel surfaces. Considering the processing of lens surface shape, it is necessary to set the surface parameter within a certain range, otherwise the processing accuracy will be low or the cutter may break (this is because the tooth shape processing is difficult, and if the acute angle of the tooth shape is smaller, the processing angle and action will be more difficult). Because of this, it is preferable to set the conic constant K within the range of [−10, 10], and the R value of the Fresnel surface of each lens is greater than 23 mm.

In the solution of the embodiment of the present disclosure, the two positive lenses, i.e., the first lens 1 and the second lens 2, both take the combination form of aspherical surface (such as convex surface)+Fresnel surface, and realize low dispersion and short-focus of the optical path structure based on the selection and cooperation of materials having different refractive indexes and Abbe numbers.

In some examples of the present disclosure, as shown in FIG. 1, the third lens 3 comprises a fifth surface 31 and a sixth surface 32; the fifth surface 31 and the fourth surface 22 of the second lens 2 are arranged adjacent to each other. At least one of the fifth surface 31 and the sixth surface 32 is an aspherical surface.

For example, the third lens 3 has a negative focal power.

That is to say, in the solution of the present disclosure, the third lens 3 is a negative lens which is thin at the center and thick at the edge and has the ability to diverge light. In the entire optical path structure, the third lens 3 can be used to eliminate chromatic aberration.

For example, the third lens 3 may be a biconcave lens (i.e., both surfaces are concave) or a plano-concave lens (i.e., one surface is concave and the other surface is flat).

More preferably, the fifth surface 31 is a flat surface, and the sixth surface 32 is a concave surface. Namely, in the optical path structure, the face adjacent to the fourth surface 22 is a flat surface, and the face adjacent to the display screen 4 is a concave surface.

Optionally, the fifth surface 31 and the sixth surface 32 are both plated with an anti-reflection film.

After the two surfaces of the third lens 3 are respectively plated with an anti-reflection film, the reflection light can be reduced by the anti-reflection films to increase the transmissivity of light on the two surfaces of the third lens 3.

In a specific example of the present disclosure, as shown in FIG. 1, the optical system comprises: the display screen 4, and the first lens 1, the second lens 2 and the third lens 3. For example, the display screen 4 can be used as a display light source. The first lens 1 and the second lens 2 are both positive lenses of aspherical surface+Fresnel surface, and the third lens 3 on the side close to the display screen 4 is set as a negative lens. All surfaces of the three lenses are plated with an anti-reflection film, and the first surface 11 of the first lens 1 is plated with a hardened film and an anti-reflection film.

On this basis, as shown in FIG. 2, the incident light emitted from the display screen 4 passes through the sixth surface 32 of the third lens 3 plated with an anti-reflection film, and enters the interior of the third lens 3. The light passing through the third lens 3 is diverged and enters the second lens 2. Two surfaces of the second lens 2 are also both plated with an anti-reflection film. In this way, the light is converged after passing through the second lens 2, and then enters the first lens 1. The first lens 1 is also a converging positive lens. After passing through the first lens 1, the light enters the human eye 5 for imaging. There is no optical path folding in the entire optical system, and the surface of each lens is plated with an anti-reflection film, so the light transmission efficiency is high.

In some examples of the present disclosure, the first lens 1 and the second lens 2 are glued at the edge areas.

Namely, the first lens 1 and the second lens 2 are glued together only at the edges by means of edge gluing.

For example, a light-transmitting optical glue is applied to the edge areas of the first lens 1 and the second lens 2 to glue them together. The refractive index of the optical glue is lower than that of each lens, such as 1.1 to 1.3.

In the above way, the first lens 1 and the second lens 2 can form a gluing system. On the one hand, the gluing system can reduce the influence of stray light caused by Fresnel teeth shape. The glued two positive lenses are assembled in the optical structure as one optical component, which reduces the difficulty of assembly. In addition, by applying the glue at the edge areas of the first lens 1 and the second lens 2 to glue them together, the risk of generating impurities between lenses during the assembly is reduced, and thus the yield is improved.

In some examples of the present disclosure, as shown in FIGS. 1 and 2, a spacing T1 is provided between the first lens 1 and the second lens 2, and the spacing T1 is set to 0.1 mm≤T1≤0.5 mm;

a spacing Y is provided between the second lens and the third lens, and the spacing Y is set to 2 mm≤Y≤4.5 mm;

the first lens 1, the second lens 2 and the third lens 3 are located on the same optical axis.

The first lens 1 and the second lens 2 are glued together, so the spacing between them is very small.

The spacing Y is provided between the second lens 2 and the third lens 3, and the relationship between the spacing Y and the aperture x of the third lens 3 is as follows:

$$Y = ax + b$$

where −0.8≤a≤−0.39, 30≤b≤35.

Namely, in the solution according to the embodiment of the present disclosure, there is a certain spacing Y between the second lens 2 and the third lens 3, and a linear negative correlation is formed between the value of the spacing Y and the value of the aperture x of the third lens 3.

In the entire optical path structure, when the second lens 2 is kept still, the size of the light passing aperture of the third lens 3 can be changed by adjusting the distance between the third lens 3 and the second lens 2. For example, the relationship between the spacing Y and the aperture x is Y=ax+b, where −0.8≤a≤−0.39, 30≤b≤35.

It can be understood that when the third lens 3 is closer to the second lens 2, the aperture x of the third lens 3 is larger. That is to say, the smaller the spacing Y between the third lens 3 and the second lens 2 is, the larger the aperture x of the third lens 3 is.

In addition, if the optical system is also provided with a display screen 4, after the spacings between lenses are reasonably arranged, the value of the spacing between the third lens 3 and the display screen 4 should also be considered.

For example, a third spacing T2 is provided between the third lens 3 and the display screen 4.

Optionally, the third spacing T2 is set to 8 mm≤T2≤15 mm.

In some examples of the present disclosure, the first lens 1 and the second lens 2 are made of the same material, and both are made of a COP material; the third lens 3 is made of an OKP material or an EP material.

COP materials, OKP materials and EP materials are all light transmitting resin materials with light weight. By using these materials to make lenses, the weight of lens groups can be reduced and thus lightweight can be realized.

For material selection of each lens, based on the consideration of short-focus and chromatic aberration, the combinations of materials having high refractive indexes and high/low Abbe numbers are selected for design optimization.

Those skilled in the art can reasonably select the materials of the first lens 1, the second lens 2 and the third lens 3 according to actual needs, which are not limited to the above types of materials.

In some examples of the present disclosure, the thickness h1 at the center of the first lens 1 is 2 mm≤h1≤4 mm; the thickness h2 at the center of the second lens 2 is 3 mm≤h2≤5 mm; the thickness h3 at the center of the third lens 3 is 2 mm≤h3≤4 mm.

The thickness of each lens will not be too thick, which is also conducive to reducing the weight of the entire optical path structure.

In some examples of the present disclosure, the sum of the effective focal length f1 of the first lens 1 and the effective focal length f2 of the second lens 2 is greater than the absolute value of the effective focal length f3 of the third lens 3.

Optionally, the effective focal length f1 of the first lens 1 is set to 20 mm≤f1≤40 mm;

the effective focal length f2 of the second lens 2 is set to 20 mm≤f2≤40 mm; and Table 1 lists the optical surface numbers (Surface) that are numbered sequentially from the human eye 5 (diaphragm) to the display screen 4, the curvature (C) of each optical surface on the optical axis, the distance (T) between each optical surface and the next optical surface on the optical axis from the human eye 5 (diaphragm) to the display screen 4, and even aspheric coefficients $\alpha_2$, $\alpha_3$, $\alpha_4$.

The aspheric coefficients can satisfy the following equation:

$$z = \frac{CY^2}{1 + \sqrt{1 - (1+k)C^2 Y^2}} + \sum_{i=2}^{N} \alpha_i Y^{2i} \tag{1}$$

In equation (1), z is a coordinate along the optical axis, Y is a radial coordinate having the unit of lens length as unit, C is the curvature (1/R), and K is the conic constant, $\alpha_i$ is the coefficient of each high-order term, and 2i is the order of aspheric coefficient. In the solution of the present disclosure, considering the smoothness of the field curve, there is no high order spheric coefficients designed to be 4th order.

TABLE 1

| Surf | Type | Radius | Thickness | GLASS | Clear Diam | Mech Diam | Conic | 4th | 6th |
|---|---|---|---|---|---|---|---|---|---|
| OBJ | STANDARD | Infinity | −1500 | | 3000 | 3000 | 0 | | |
| STO | STANDARD | Infinity | 12 | | 4 | 4 | 0 | | |
| 2 | EVENASPH | 45.00028 | 3.03901 | K26R | 31.82816 | 32.98531 | −5.518382 | −3.26E−06 | −2.78E−08 |
| 3 | FRESNELS | −25.99994 | 0.1 | | 32.98531 | 32.98531 | −0.7736046 | 8.75E−06 | −5.97E−08 |
| 4 | FRESNELS | 26.00475 | 3.5003 | K26R | 33.04182 | 33.04182 | −0.3239605 | 7.43E−06 | 1.79E−08 |
| 5 | EVENASPH | −40.60183 | 2.000039 | | 32.21852 | 32.21852 | −10.00006 | 9.45E−06 | 3.72E−08 |
| 6 | EVENASPH | −249.951 | 2.998815 | OKP-1 | 31.01456 | 31.01456 | −9.998311 | −3.11E−06 | 2.51E−08 |
| 7 | EVENASPH | 42.51127 | 11.2 | | 29.66907 | 31.01456 | 0.4595704 | 1.49E−07 | −9.59E−08 |
| 8 | STANDARD | Infinity | 0.45 | BK7 | 25.21718 | 25.2614 | 0 | | |
| 9 | STANDARD | Infinity | 0.0224408 | | 25.2614 | 25.2614 | 0 | | |
| IMA | STANDARD | Infinity | | | 25.06475 | 25.06475 | 0 | | | the effective focal length f3 of the third lens 3 is set to −100 mm≤f3≤−50 mm.

In some examples of the present disclosure, the effective focal length f of the optical system satisfies 15 mm≤f≤25 mm.

The present disclosure provides a short-focus optical system. There is no optical path folding in the entire optical system. It is a direct transmission optical system that can achieve high-resolution imaging.

The following is an application example of the solution according to an embodiment of the present disclosure:

(1) A 90 degree field of view is realized in 1.4 inch display screen 4.

(2) The distortion is less than 34.6%, and the field curvature is less than 0.5 mm.

(3) The chromatic aberration is less than 178 μm. The virtual image distance is 1500 mm.

(4) The spot sizes at 0 to 1.0F are all less than two display pixels, realizing clear imaging in visible light band (450 nm to 630 nm).

(5) The effective focal length of the optical system is 19.13 mm, the total optical length is 23.31 mm, and the aperture x of the third lens 3 is 33.2 mm.

First Embodiment

The first embodiment provides an optical system, and the structure parameters in the optical system are shown in Table 1.

The performance of the optical system according to the first embodiment of the present disclosure is demonstrated by the following parameters.

Figure 6:
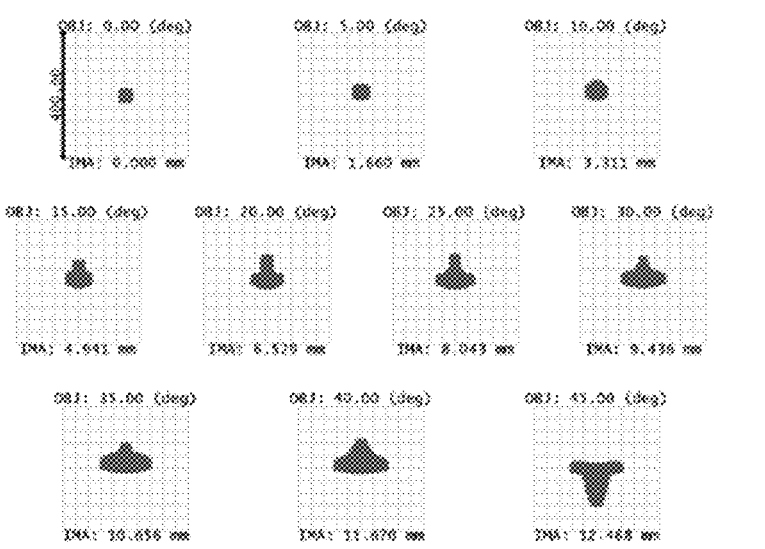
FIG. 6 is a spot diagram of an optical system according to the first embodiment of the present disclosure.

As shown in FIG. 6, the maximum spot size is at the position of the maximum field of view (1.0F), and its maximum value is less than 44 μm.

Figure 7:
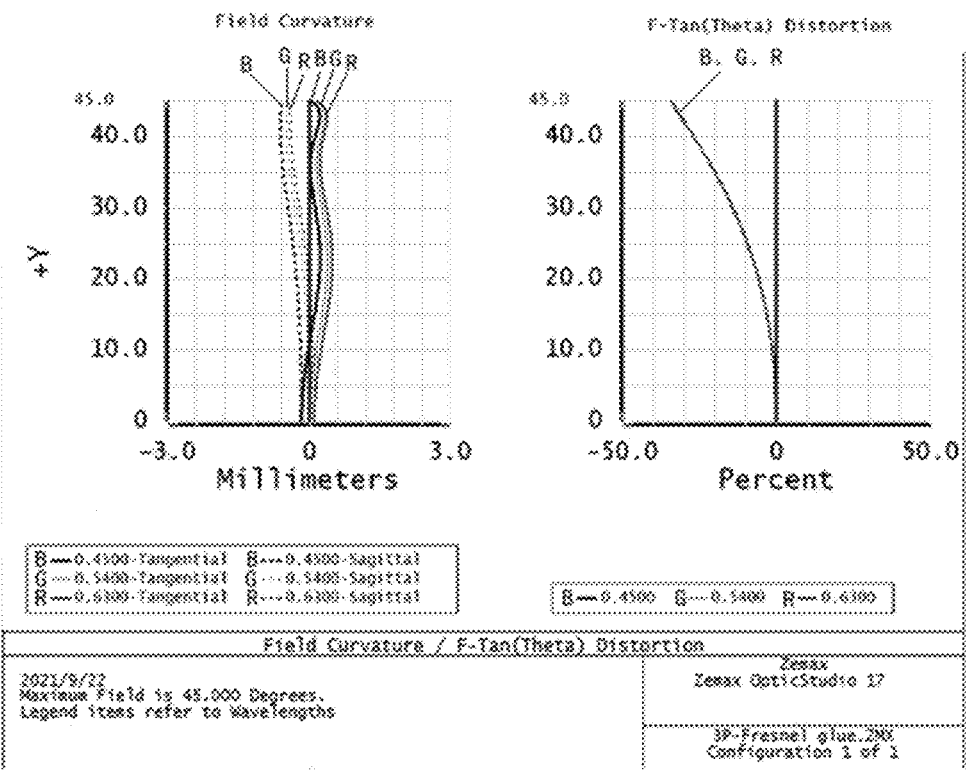
FIG. 7 is a field curvature and distortion diagram of an optical system according to the first embodiment of the present disclosure.

As shown in FIG. 7, the field curvatures of RGB wavelengths in T and S directions are less than 0.5 mm, and the maximum distortion is at the position of the maximum field of view and is less than 34.5%.

As shown in FIG. 8, the maximum dispersion of RGB is at the position of the maximum field of view, the whole RGB is 450 nm to 610 nm, and the LCA is 178 nm.

In the optical system according to the embodiment of the present disclosure, the relationship between the aperture x of the third lens 3 and the spacing Y between the third lens 3 and the second lens 2 is as follows:

when the third lens 3 is closer to the second lens 2, the aperture x of the third lens 3 is larger, and there is a linear negative correlation between them.

Figure 3:
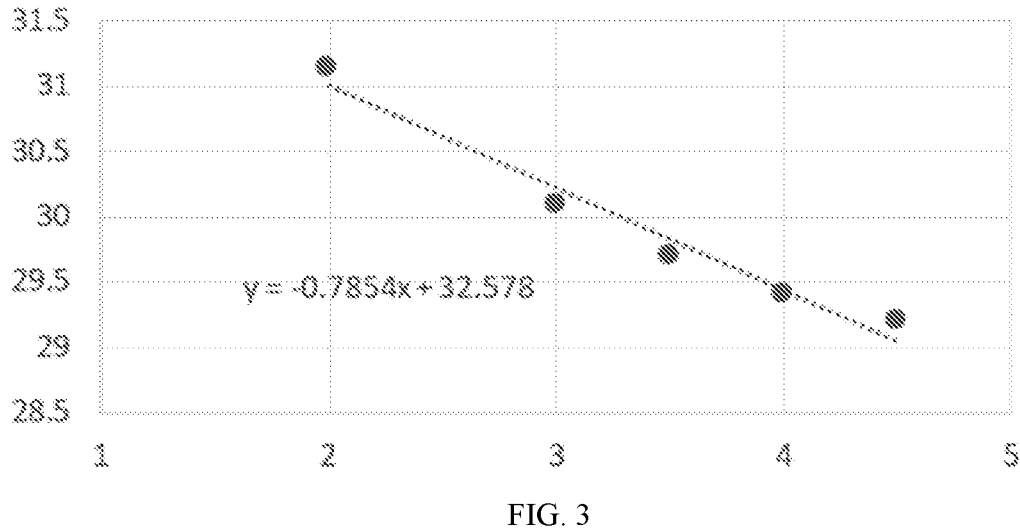
FIG. 3 to FIG. 5 are diagrams showing the relationship between an aperture x of a third lens and a spacing Y between the third lens and a second lens in an optical system according to an embodiment of the present disclosure.
Figure 4:
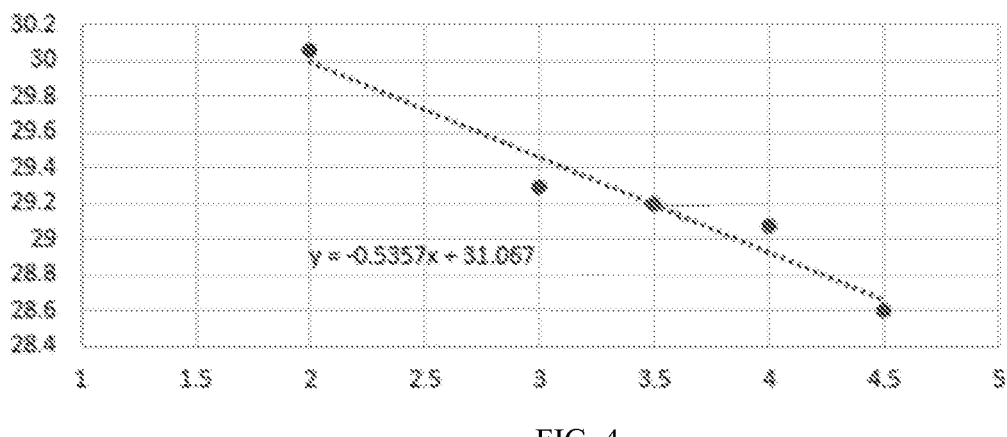
Figure 5:
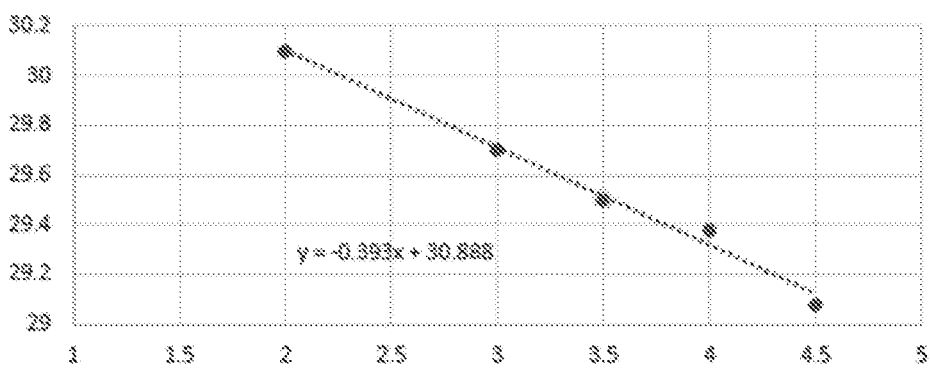

It will be illustrated below using three embodiments, as shown in FIGS. 3 to 5.

Second Embodiment

In the optical system, the first lens 1 and the second lens 2 are set to have positive focal powers, and their surface parameters are respectively as follows:

the first lens 1: the radius R1 of the first surface 11 (a convex surface) is 45 mm, and the radius R2 of the second surface 12 (a Fresnel surface) is 25 mm;

the second lens 2: the radius of the third surface 21 (a Fresnel surface) R3 is 25 mm, and the radius of the fourth surface 22 (a convex surface) R4 is 45 mm.

The third lens 3 has a negative focal power, and is arranged close to the display screen 4.

When the spacing Y between the second lens 2 and the third lens 3 is set to 2 mm, the corresponding aperture x of the third lens 3 is 31.14 mm.

When the spacing Y between the second lens 2 and the third lens 3 is set to 3 mm, the corresponding aperture x of the third lens 3 is 30.1 mm.

When the spacing Y between the second lens 2 and the third lens 3 is set to 3.5 m, the corresponding aperture x of the third lens 3 is 29.7 mm.

When the spacing Y between the second lens 2 and the third lens 3 is set to 4 mm, the corresponding aperture x of the third lens 3 is 29.4 mm.

When the spacing Y between the second lens 2 and the third lens 3 is set to 4.5 mm, the corresponding aperture x of the third lens 3 is 29.2 mm.

According to the relationship between the spacing Y between the second lens 2 and the third lens 3 and the aperture x of the third lens 3 as listed above, it can be determined that they are linearly negatively correlated, as shown in FIG. 3, Y=−0.7854x+32.578.

Third Embodiment

In the optical system, the first lens 1 and the second lens 2 are set to have positive focal powers, and their surface parameters are respectively as follows:

the first lens 1: the radius of the first surface 11 (a convex surface) R1 is 35 mm, and the radius of the second surface 12 (a Fresnel surface) R2 is 25 to 29 mm;

the second lens 2: the radius of the third surface 21 (a Fresnel surface) R3 is 25 to 29 mm, and the radius of the fourth surface 22 (a convex surface) R4 is 35 mm.

The effective focal length f1 of the first lens 1≈the effective focal length f2 of the second lens 2=29 mm.

The third lens 3 has a negative focal power, and is arranged close to the display screen 4.

When the spacing Y between the second lens 2 and the third lens 3 is set to 2 mm, the corresponding aperture x of the third lens 3 is 30.06 mm.

When the spacing Y between the second lens 2 and the third lens 3 is set to 3 mm, the corresponding aperture x of the third lens 3 is 29.3 mm.

When the spacing Y between the second lens 2 and the third lens 3 is set to 3.5 m, the corresponding aperture x of the third lens 3 is 29.2 mm.

When the spacing Y between the second lens 2 and the third lens 3 is set to 4 mm, the corresponding aperture x of the third lens 3 is 29.07 mm.

When the spacing Y between the second lens 2 and the third lens 3 is set to 4.5 mm, the corresponding aperture x of the third lens 3 is 28.6 mm.

According to the relationship between the spacing Y between the second lens 2 and the third lens 3 and the aperture x of the third lens 3 as listed above, it can be determined that they are linearly negatively correlated, as shown in FIG. 4, Y=−0.5357x+31.078.

Fourth Embodiment

In the optical system, the first lens 1 and the second lens 2 are set to have positive focal powers, and their surface parameters are respectively as follows:

the first lens 1: the radius of the first surface 11 (a convex surface) R1 is 50 mm, and the radius of the second surface 12 (a Fresnel surface) R2 is 25 mm;

the second lens 2: the radius of the third surface 21 (a Fresnel surface) R3 is 25 mm, and the radius of the fourth surface 22 (a convex surface) R4 is 50 mm.

The effective focal length f1 of the first lens 1≈the effective focal length f2 of the second lens 2=29 mm;

The third lens 3 has a negative focal power, and is arranged close to the display screen 4.

When the spacing Y between the second lens 2 and the third lens 3 is set to 2 mm, the corresponding aperture x of the third lens 3 is 30.1 mm.

When the spacing Y between the second lens 2 and the third lens 3 is set to 3 mm, the corresponding aperture x of the third lens 3 is 29.7 mm.

When the spacing Y between the second lens 2 and the third lens 3 is set to 3.5 m, the corresponding aperture x of the third lens 3 is 29.5 mm.

When the spacing Y between the second lens 2 and the third lens 3 is set to 4 mm, the corresponding aperture x of the third lens 3 is 29.38 mm.

When the spacing Y between the second lens 2 and the third lens 3 is set to 4.5 mm, the corresponding aperture x of the third lens 3 is 29.08 mm.

According to the relationship between the spacing Y between the second lens 2 and the third lens 3 and the aperture x of the third lens 3 as listed above, it can be determined that they are linearly negatively correlated, as shown in FIG. 5, Y=−0.393x+30.888.

It can be seen from the above second to fourth embodiments that the spacing Y between the third lens 3 and the second lens 2 is linearly negatively correlated with the aperture x of the third lens 3. However, the linear coefficients obtained from different lens surface parameters are slightly different, for example:

$$Y = ax + b$$

where $-0.8 \leq a \leq -0.39$, $30 \leq b \leq 35$, Y is the spacing T between the second lens 2 and the third lens 3, and x is the aperture of the third lens 3.

The embodiments of the present disclosure provide a short-focus optical system, which does not involve a folded optical path.

(1) By combining multiple optical lenses (such as three lenses, including two glued positive lenses and one separated negative lens), the ultra-short-focus effect can be achieved well.

(2) Gluing the Fresnel surfaces of the two positive lenses can reduce stray light, and facilitates the assembly of the two positive lenses in the optical path structure, thereby simplifying the assembly process.

(3) The parameters of the negative lens close to the display screen 4 are specially designed, which facilitates improving the imaging quality.

According to another aspect of the present disclosure, a head mounted display is provided.

The head mounted display comprises an optical system as described above.

The head mounted display is, for example, a VR device.

The description of the above embodiments focuses on the differences between various embodiments. As long as the different optimized features between the embodiments are not contradictory to each other, they can be combined to form a better embodiment, which will not be repeated herein for simplicity of the description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An optical system, comprising:
a display screen (4), and a third lens (3), a second lens (2) and a first lens (1) arranged successively along a propagation direction of incident light,
wherein an effective focal length f1 of the first lens (1) and an effective focal length f2 of the second lens (2) are both greater than an effective focal length f of the optical system,
the third lens (3), second lens (2) and first lens (1) are arranged at a light exit side of the display screen (4), in the propagation direction of the incident light emitted from the display screen (4), and used to project the incident light into the human eye (5) for imaging,
the first lens (1) and the second lens (2) are glued together, the two glued surfaces of the first lens (1) and the second lens (2) are both Fresnel surfaces,
the first lens (1), the second lens (2) and the third lens (3) are located on a same optical axis,
the first lens (1) comprises a first surface (11) and a second surface (12), and the second lens (2) comprises a third surface (21) and a fourth surface (22), the second surface (12) and the third surface (21) are arranged adjacent to each other and both are set as Fresnel surfaces, and the first surface (11) and the fourth surface (22) are both convex surfaces,
the thickness h1 at the center of the first lens (1) is 2 mm≤h1≤4 mm; the thickness h2 at the center of the second lens (2) is 3 mm≤h2≤5 mm; the thickness h3 at the center of the third lens (3) is 2 mm≤h3≤4 mm, a spacing T1 is provided between the first lens (1) and the second lens (2), and the spacing T1 is set to 0.1 mm≤T1≤0.5 mm;
a third spacing T2 is provided between the third lens (3) and the display screen (4), the third spacing T2 is set to 8 mm≤T2≤15 mm;
a spacing Y is provided between the second lens (2) and the third lens (3), and the spacing Y is set to 2 mm≤Y≤4.5 mm;
the spacing Y and the aperture x of the third lens (3) satisfies the following relationship: Y=ax+b, where −0.8≤a≤−0.39, 30≤b≤35.

2. The optical system according to claim 1, wherein the first lens (1) and the second lens (2) both have positive focal powers, and the third lens (3) has a negative focal power.

3. A head mounted display comprising the optical system according to claim 2.

4. The optical system according to claim 1, wherein a sum of the effective focal length f1 of the first lens (1) and the effective focal length f2 of the second lens (2) is greater than an absolute value of the effective focal length f3 of the third lens (3).

5. A head mounted display comprising the optical system according to claim 4.

6. The optical system according to claim 1, wherein the effective focal length f1 of the first lens (1) is set to 20 mm≤f1≤40 mm;
the effective focal length f2 of the second lens (2) is set to 20 mm≤f2≤40 mm; and
the effective focal length f3 of the third lens (3) is set to −100 mm≤f3≤−50 mm.

7. The optical system according to claim 6, wherein the effective focal length f of the optical system satisfies 15 mm≤f≤25 mm.

8. A head mounted display comprising the optical system according to claim 7.

9. A head mounted display comprising the optical system according to claim 6.

10. The optical system according to claim 1, wherein the first lens (1) and the second lens (2) are made of a same material, and are made of a COP material; and
the third lens (3) is made of an OKP material or an EP material.

11. A head mounted display comprising the optical system according to claim 10.

12. A head mounted display comprising the optical system according to claim 1.

* * * * *